(12) United States Patent
Zhu et al.

(10) Patent No.: US 6,985,326 B2
(45) Date of Patent: Jan. 10, 2006

(54) MULTI-LAYER ELECTRODE DEVICE ON SLIDER FOR ELECTROSTATIC FLY HEIGHT ADJUSTMENT

(75) Inventors: Jianxin Zhu, Eagan, MN (US); Joel W. Hoehn, Hudson, WI (US); Dian Song, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 218 days.

(21) Appl. No.: 10/715,163

(22) Filed: Nov. 17, 2003

(65) Prior Publication Data

US 2005/0105203 A1    May 19, 2005

(51) Int. Cl.
*G11B 21/02* (2006.01)
(52) U.S. Cl. .............. 360/75; 360/294.7; 369/300
(58) Field of Classification Search ............ None
See application file for complete search history.

(56) References Cited

U.S. PATENT DOCUMENTS

| | | | |
|---|---|---|---|
| 5,282,190 A * | 1/1994 | Maruo et al. ............ 369/300 |
| 6,272,909 B1 | 8/2001 | Yao et al. | |
| 6,501,606 B2 | 12/2002 | Boutaghou et al. | |
| 6,570,730 B1 | 5/2003 | Lewis et al. | |
| 6,757,120 B2 * | 6/2004 | Minoshima et al. ........ 360/31 |
| 2002/0097517 A1 | 7/2002 | Bonin et al. | |
| 2003/0043497 A1 | 3/2003 | Riddering et al. | |
| 2003/0081352 A1 | 5/2003 | Rao et al. | |
| 2004/0051992 A1 * | 3/2004 | Boutaghou et al. ........ 360/75 |
| 2004/0233568 A1 * | 11/2004 | Rao et al. ................. 360/75 |
| 2004/0233583 A1 * | 11/2004 | Yanagisawa ............ 360/294.7 |

* cited by examiner

*Primary Examiner*—Andrew L. Sniezek
(74) *Attorney, Agent, or Firm*—Kinney & Lange, P.A.

(57) ABSTRACT

In an electrostatic actuator used to control fly height between a magnetic disc and a read/write head of a disc drive, a multi-layer electrode device is used. The multi-layer electrode device includes alternating insulating layers and conductive electrode layers. By controlling the material properties of each layer of the electrode device, problems associated with leakage current, field emission discharge, tunneling current, and slow actuator response time can be controlled.

12 Claims, 5 Drawing Sheets

MULTI-LAYER ELECTRODE DEVICE ON SLIDER FOR ELECTROSTATIC FLY HEIGHT ADJUSTMENT

BACKGROUND OF THE INVENTION

The present invention relates generally to magnetic data storage devices. In particular, this invention relates to electrostatic actuators for fly height control.

Fly height between the read/write head and the magnetic disc surface in data storage devices has become smaller as the density of data stored increases. Increased density results in narrower data tracks and smaller data bits. These smaller dimensions require the read/write head to be closer to the disc surface to accurately interact with the disc. As the fly height decreases, it becomes increasingly difficult to prevent damage to the read/write head and disc surface. Undesired mechanical contact and electrical interaction between the read/write head and the disc surface can cause damage to those components or reduce performance.

Prior attempts to control fly height include the use of electrostatic actuators. Electrostatic actuators make use of two electrodes, between which an electric field is maintained to control the distance between the electrodes. One electrode is formed by or deposited on the air bearing slider that carries the read/write head. The other electrode is formed by the magnetic disc media. Electrostatic actuators control fly height by a generated attractive force between the slider and the disc surface that increases as the fly height decreases. If the attractive force increases too much, it can result in collisions and near collisions between the read/write head and the disc surface. The problem of collision and near collision is compounded by slight variations in the disc topography related to manufacturing limitations. Collision results in a discharge from the electrode due to tunneling current. Tunneling current is the undesired flow of electrons across the fly height gap. Collision may also result in physical damage to the disc surface due to rough contact with the electrode. Near collision results in field emission discharge between the slider electrode and the disc. Field emission discharge is the undesired loss of potential due to a large potential present across a small gap.

Electrostatic actuators must also maintain relatively fast response times. The fly height actuator receives voltage input from a fly height controller. The fly height controller generates a fly height control voltage directly proportional to a sensed fly height. A feedback loop is maintained between the fly height controller and the fly height actuator in order to maintain a desired fly height. To ensure the fly height is set to the proper height at the appropriate time by the fly height actuator, as called for by the fly height controller, the fly height electrode must have rapid response time.

In the case of sliders composed of conductive material, such as AlTiC, previous electrostatic actuators have used the slider surface as one of the electrodes necessary for the operation of the fly height control actuator, see published U.S. application Ser. No. 20020097517, Bonin et al. Improvements on this method have been made by using a separate metal electrode device insulated from the slider to serve as one electrode of the fly height control actuator, see published U.S. application Ser. No. 20030043497, Ridderring et al. It is advantageous to use an isolated electrode instead of the slider surface because it becomes necessary to only supply voltage to the electrode instead of the whole slider to activate the fly height control actuator. Having the whole slider supplied with voltage creates the danger of short circuit and discharge of the electrode when contact between the slider and disc media occurs. Electrodes can also be positioned such that it is more likely the grounded slider contacts the disc rather than the electrode in order to avoid short circuit and discharge.

BRIEF SUMMARY OF THE INVENTION

The present invention is a multi-layer electrode that improves the performance characteristics of electrostatic fly height actuators. Specifically, the present invention yields improved response time while also reducing tunneling current, field emission discharge, and leakage current of electrodes used in actuators to control fly height between the read/write head and the magnetic disc surface in disc drives.

To achieve these characteristics, a multi-layer electrode device is deposited on the slider for use in the fly height actuator. In one embodiment, a multi-layer electrode makes use of two electrode layers, a first electrode being supplied by the actuator power source, and a second electrode layer that is electrically isolated from the first electrode layer. The multi-layer electrode is capable of reducing leakage current, minimizing tunneling current, and also reducing field emission discharge. Yet, the electrode is also capable of transmitting a sufficient charge to the tip of the electrode to generate an effective electrostatic force. The present invention also eliminates high series resistance which in turn improves actuation response time.

The multi-layer electrode device preferably includes a first insulator layer affixed to the slider. The first electrode layer, a second insulator layer, the second electrode layer, and a third insulator layer are deposited in sequence on the exposed surface of the first insulator layer. In other embodiments additional layers can be added.

DETAILED DESCRIPTION OF THE PREFERRED EMBODIMENT

Figure 1:
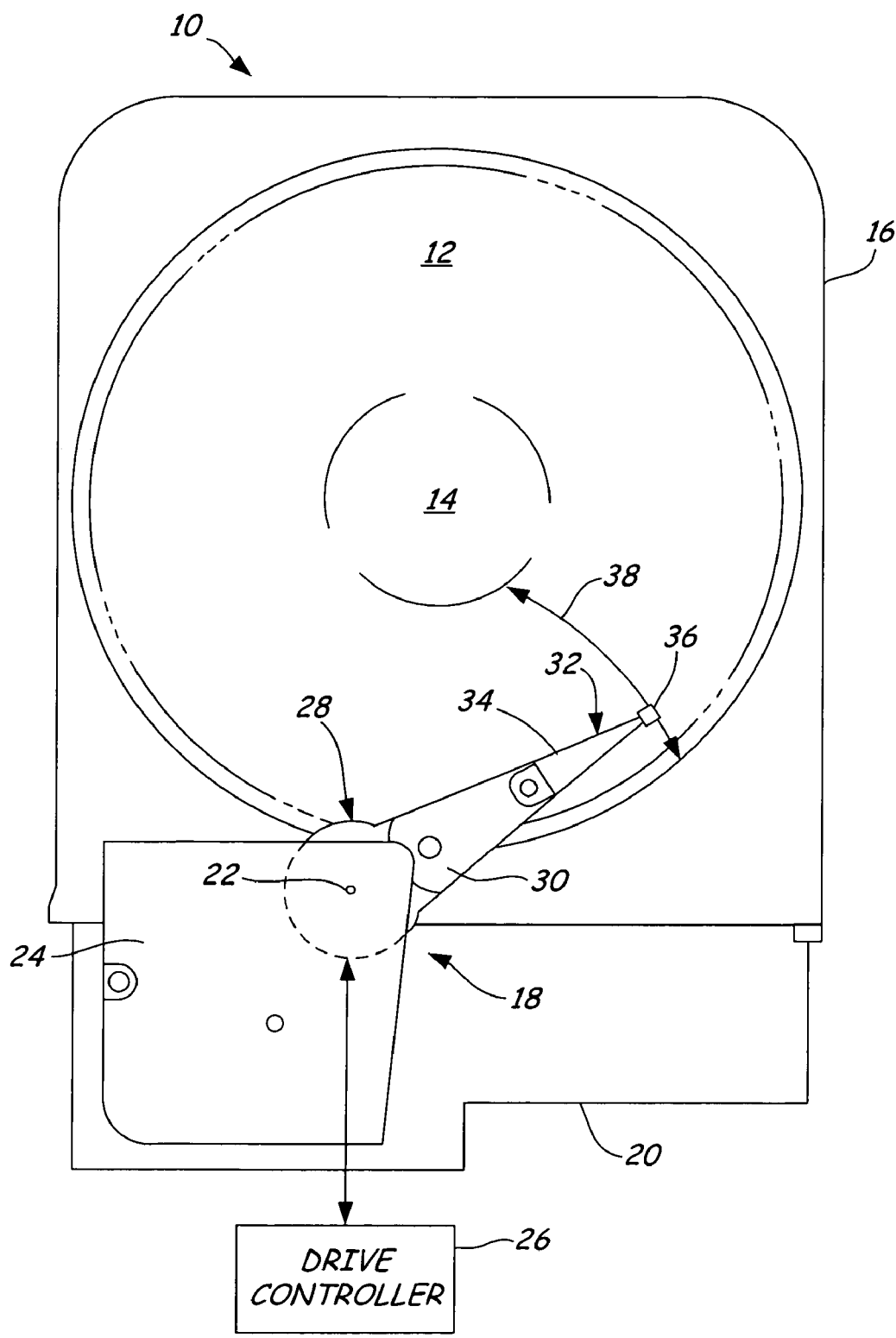
FIG. 1 is a top view of a disc drive system.

FIG. 1 illustrates the major components of a disc drive system 10 in which a multi-layer electrode device in accord with the present invention is used. Disc drive system 10 includes magnetic disc 12 mounted for rotational movement about an axis defined by spindle 14 within housing 16. Disc drive 10 also includes actuator 18 mounted to base plate 20 of housing 16 and pivotally movable relative to magnetic disc 12 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18. Actuator 18 includes actuator arm assembly 28, a rigid support member 30, and head gimbal assembly 32. Head gimbal assembly 32 includes flexure arm 34 coupled to rigid member 30 and air bearing slider 36 coupled to flexure arm 34 by a gimbal. Slider 36 supports a read/write transducer or head for reading information from magnetic disc 12 and writing information to magnetic disc 12. The multi-layer electrode device of this invention is deposited on the slider 36 to form an actuator to control fly height of the slider 36. Fly height is a measure of the vertical distance between the slider 36 and the magnetic disc 12.

During operation, drive controller 26 receives position information indicating a portion of magnetic disc 12 to be accessed. Drive controller 26 receives the position information from either an operator, a host computer, or from another suitable controller. Based on the position information, drive controller 26 provides a position signal to actuator 18. The position signal causes actuator 18 to pivot about axis 22. This causes slider 36 to move radially over the surface of magnetic disc 12 in a generally arc-like path indicated by arrow 38. Drive controller 26 and actuator 18 operate in a closed loop, negative feedback manner so that the transducer carried by slider 36 is positioned over the desired portion of magnetic disc 12. Fly height can be maintained using the multi-layer electrode device of this invention. Once the transducer is appropriately positioned, drive controller 26 then executes a desired read or write operation.

Figure 2:
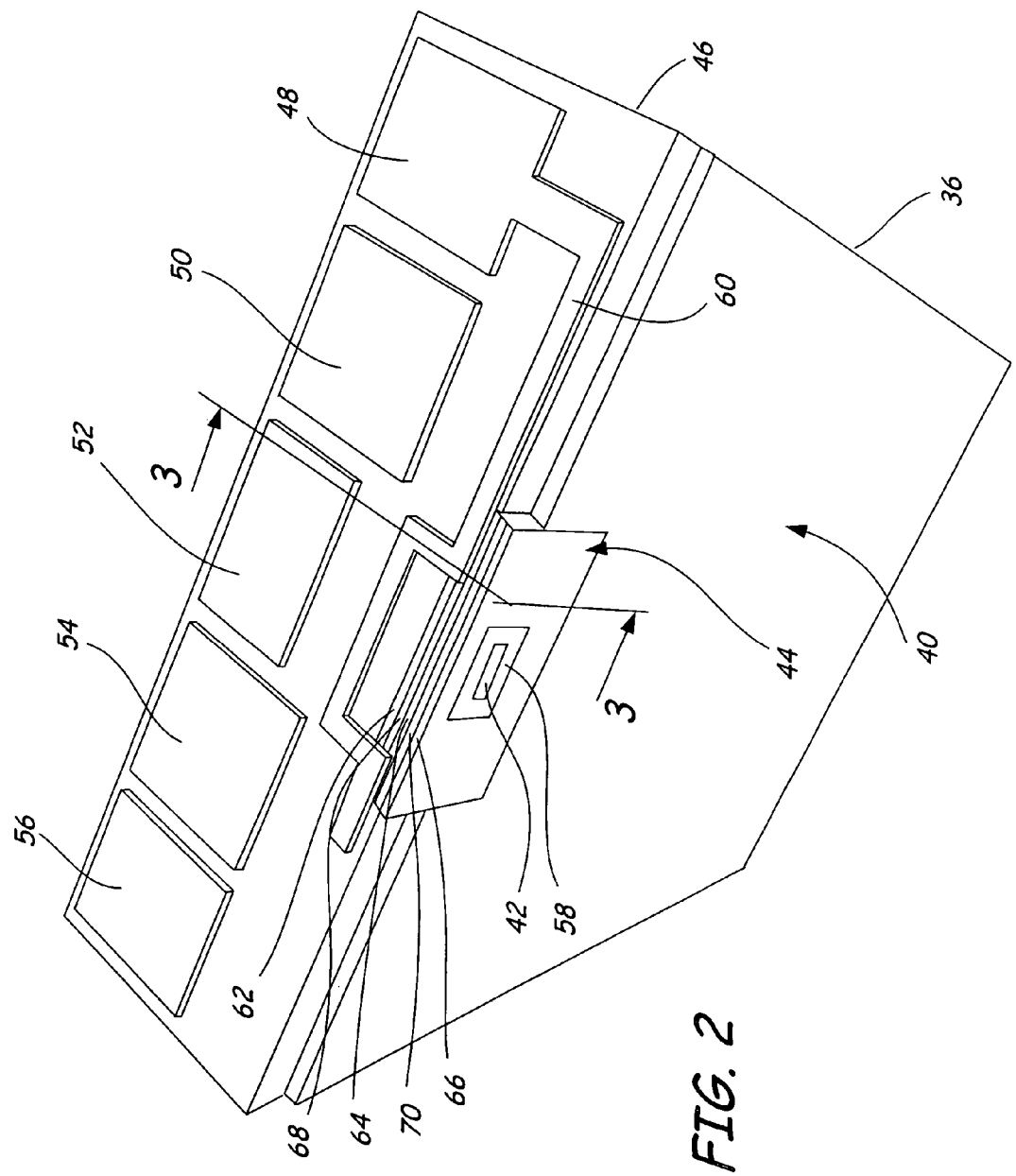
FIG. 2 is a perspective view of a slider containing one embodiment of the multi-layer electrode device.

FIG. 2 shows a perspective view of a disc head slider 36. The air bearing surface 40 of the slider 36 is viewed as from the surface of magnetic disc 12. Typically, air bearing surface 40 will have a number of structures, such as rails, crossbars and cavities, which are not shown in FIG. 2 for the sake of simplicity.

In FIG. 2, transducer 42, which typically includes a magnetic writer and a magnetoresistive (MR) reader, is shown as being positioned at the center of the trailing edge of the slider 36. A multi-layer electrode device 44 is deposited in a recessed portion of the slider 36 at the trailing edge over the transducer 42. The slider 36 also has an overcoat 46 and a multi-layer electrode device bond pad 48. The slider 36 also has additional bond pads for read and write operations of the transducer 42. These are represented as the reader bond pads 50 and 52, and the writer bond pads 54 and 56.

In this embodiment, the multi-layer electrode device 44 has a hollow center. The slider 36 has a three-sided "U" shaped channel notched in the air bearing surface 40 at the center of the trailing edge, such that a pedestal 58 is created on the slider 36. The transducer 42 is positioned on the surface of the slider 36 at the trailing edge with the lower portion of the transducer 42 being located on the pedestal 58. The multi-layer electrode device 44 is positioned on the slider 36 such that the pedestal 58 is located in the center multi-layer electrode device 44, the multi-layer electrode device 44 thus surrounds the pedestal 58 and the bottom portion of the transducer 42. The center opening of the ring shaped multi-layer electrode device 44 is large enough to accommodate the pedestal 58 and the transducer 42 and also to allow a sufficient gap between the transducer 42 and multi-layer electrode device 44 in order to eliminate interference with read/write operations. In one embodiment, the multi-layer electrode device 44 allows for a gap of between 20 microns to 100 microns. The overcoat 46 is deposited over the trailing edge of the slider 36. Overcoat 46 is further notched on the surface facing the magnetic disc 12 in order to accommodate the portion of the multi-layer electrode device 44 not located within the "U" shaped channel of the slider 36. The transducer 42 is positioned between the slider 36 and the overcoat 46 such that a bottom portion of the transducer 42 extends into the notched region of the overcoat 46 along the pedestal 58.

The multi-layer electrode device bond pad 48 is deposited on, the surface of the overcoat 46 opposite the surface facing the trailing edge of the slider 36. The multi-layer electrode device bond pad 48 is supplied with a fly height control voltage $V_{FH}$. This voltage powers the multi-layer electrode device 44 when adjusting fly height. The multi-layer electrode device bond pad 48 also has a connection trace 60 which connects the multi-layer electrode device 44 with the multi-layer electrode device bond pad 48. The connection trace 60 connects to the multi-layer electrode device 44 at the two ends of the multi-layer electrode device 44 exposed on the trailing edge. The connection trace 60 avoids connection with the multi-layer electrode device 44 in the area where the transducer 42 is concealed behind the multi-layer electrode device 44 and the overcoat 46 in order not to bias read/write operations.

The multi-layer electrode device 44 has three insulator layers 62, 64, 66 and two electrode layers 68, 70. The top surface of first insulator layer 62 opposes the bottom surface of the slider 36 and has a bottom surface facing the magnetic disc 12. First electrode layer 68, for connection to a fly height control voltage, has a top surface that opposes the bottom surface of first insulator layer 62 and a bottom surface that faces the magnetic disc 12. Second insulator layer 64 has a top surface that opposes the bottom surface of first electrode layer 68 and a bottom surface that faces the magnetic disc 12. Second electrode layer 70 has a top surface that opposes the bottom surface of second insulator layer 64 and a bottom surface that faces the magnetic disc 12. Third insulator layer 66 has a top surface that opposes the bottom surface of second electrode layer 70 and a bottom surface that faces the magnetic disc 12.

The multi-layer electrode device 44 is one electrode in the fly height actuator and the magnetic disc 12 facing the multi-layer electrode device 44 is the opposing electrode. The fly height control actuator is thus able to control fly height when the actuation voltage from the fly height sensor is applied to the multi-layer electrode device bond pad 48.

Figure 3:
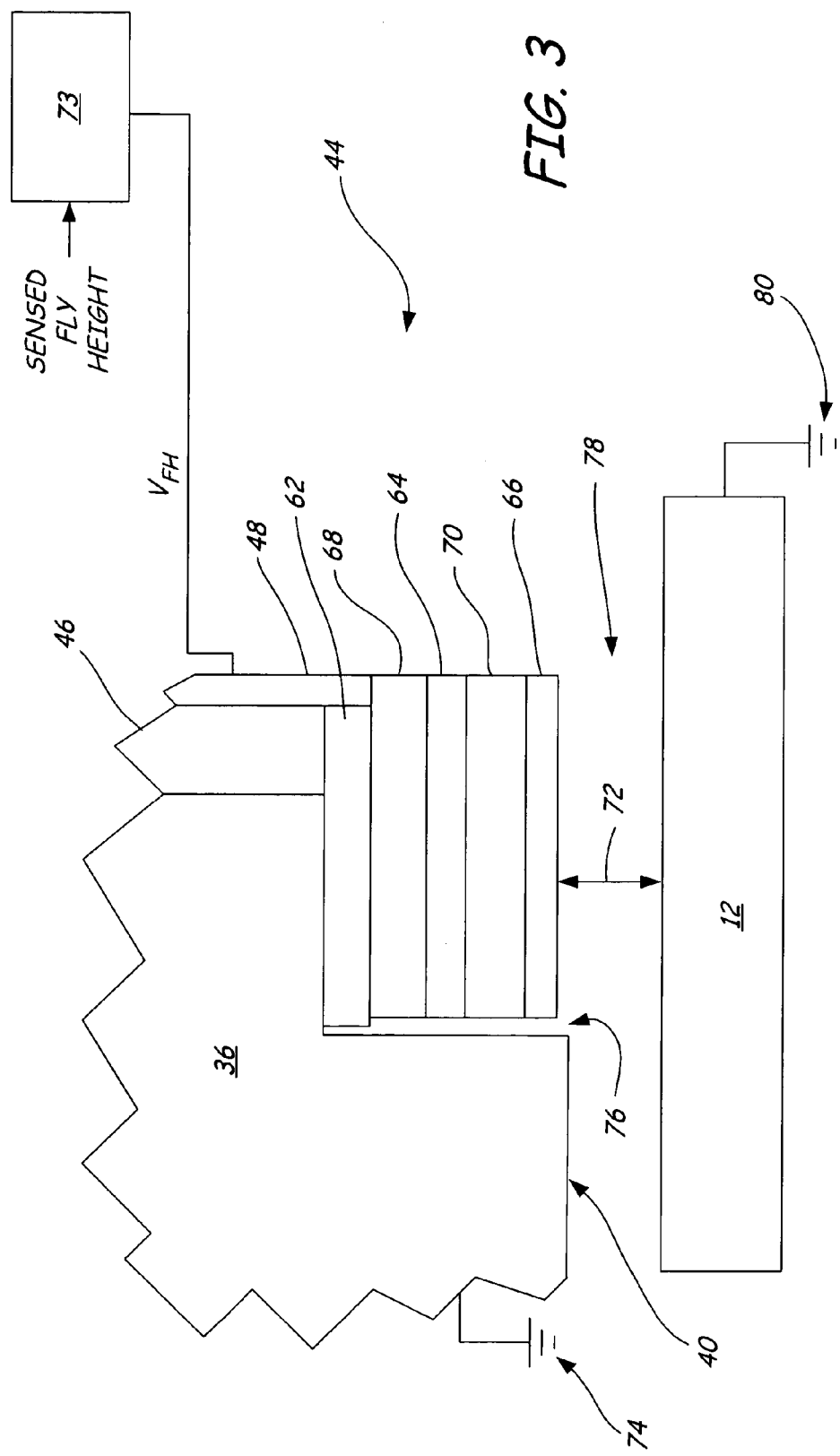
FIG. 3 is a sectional view of one embodiment of the multi-layer electrode device as located on the slider.

FIG. 3 is a broken section view of section 3—3 of FIG. 2. It shows one embodiment of the multi-layer electrode device 44 as deposited on the slider 36. The air bearing surface 40 of the slider 36 is suspended over and faces the magnetic disc 12 in order to permit the transducer 42 (not shown) to interact with the magnetic disc 12. Overcoat 46 is also affixed to the trailing edge of the slider 36 and covers transducer 42. The multi-layer electrode device bond pad connection 48 supplies the fly height control voltage $V_{FH}$ from a fly height controller 73 to the multi-layer electrode device 44. Fly height 72 is a measure of distance between the air bearing surface 40 and the magnetic disc 12. Fly height 72 is on the order of 5 to 20 nanometers. The slider 36 is grounded 74 and electrically isolated from the multi-layer electrode device 44. The slider 36 includes a recess 76 to accommodate the multi-layer electrode device 44 and to assist in preventing the multi-layer electrode device 44 from contacting the magnetic disc 12. The fly height is controlled by a voltage between two electrodes positioned above and below the fly height air gap 72. The first electrode is the multi-layer electrode device 44 and the second is the magnetic disc 12. The fly height control voltage $V_{FH}$ is supplied from the fly height controller 73 via the multi-layer electrode device bond pad connection 48 to multi-layer electrode device 44. The fly height control voltage $V_{FH}$ is a function of desired fly height 72 change, also known as "stroke".

The overall thickness of the multilayer electrode device 44 is preferably small to the extent that it is manufacturing plus or minus 3% variance would not exceed the clearance between the device and the disc, which would cause contact or near-field interference. In preferred embodiments the entire thickness of the multi-layer electrode device (excluding layer 62) 206 is between 300 Å to 800 Å thick.

First insulator layer 62 attaches to the slider 36 to isolate the multi-layer electrode device 44 from the slider 36. First insulator layer 62 is of a thickness sufficient to insulate the multi-layer electrode device 44 from the slider 36. Second insulator layer 64 can be made of any satisfactory insulating material. As faster response time and high stroke is desired for fly height actuation thinner insulators or high-K dielectrics may be used.

It is desirable-that electrodes limit tunneling current flow in the device and prevent field emission discharge to the magnetic disc 12. Thus, third insulator layer 66 is added to the device at disc interface. This limits tunnel current onto the magnetic disc 12 during electrode/disc contact and also reduces field emission discharge during near electrode/disc interface. Third insulator layer 66 may also be made of any satisfactory insulating material as required for specific designs. Thinner insulators or higher K dielectric materials may be used to increase the device stroke. Dielectric materials prevent electron flow up to their corresponding breakdown point. Generally, it desirable to keep the voltage of a typical disc drive system below 12 volts, preferably at about 5 volts.

The two series capacitors in the device may potentially reduce the amount of total electrostatic charge it can hold, as capacitors in series connection lower the total capacitance. Reduced capacitance may reduce the device stroke. However, by applying a layer of insulator 66 using thinner and higher-K material, it is possible to reach the optimal point to have adequate stroke while maintaining reliable interface with low current flow between disk and the device. First electrode layer 68 is connected to the fly height control voltage $V_{FH}$ via the multi-layer electrode device bond pad connection 48. First electrode layer 68 is a thin layer of conductive metal. Second insulator layer 64 limits the leakage current of the system by being of a sufficient thickness to create a substantial resistive effect in the actuator system. In one embodiment a high K dielectric material is used, however, any satisfactory dielectric or insulating material can be used as insulator layer 64. By having a second capacitance in the actuator system, the capacitance across the fly height gap 72 can be maintained sufficiently high to generate an adequate electrostatic force while also keeping the voltage at the interface 6f second tunnel current.

Second electrode layer 70 is a thin layer of conductive metal. Second electrode layer 70 activates the fly height actuator 78 when it is under an applied voltage field from first electrode layer 68.

Overall, the multi-layer electrode device 44 introduces an additional capacitive element to the fly height actuator 78 Which reduces leakage current, minimizes tunneling current, and reduces field emission discharge while maintaining rapid response time. These benefits are more clearly illustrated in the equivalent circuit structure of the multi-layer electrode device 44.

Figure 4:
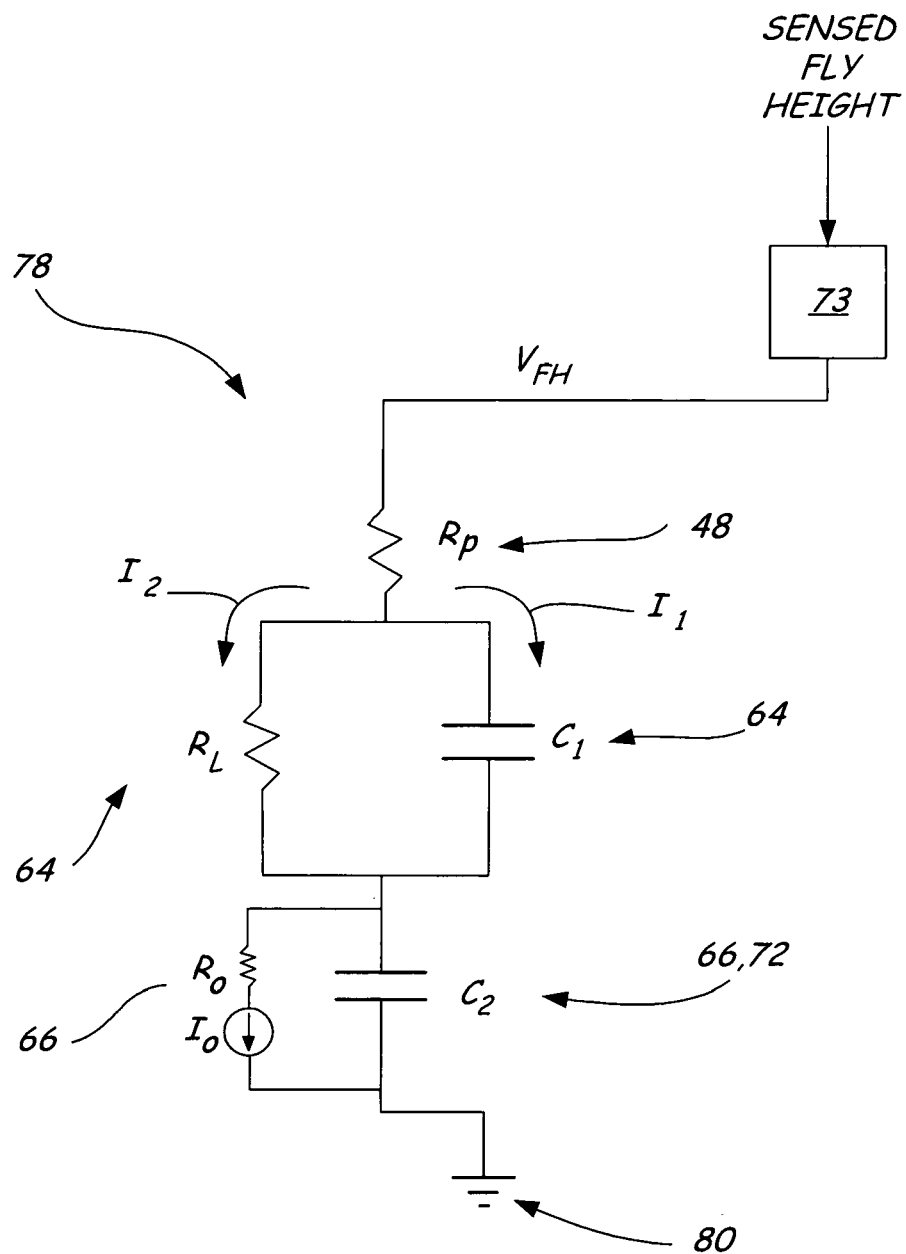
FIG. 4 is an equivalent circuit representation of the multi-layer electrode device.

FIG. 4 is the equivalent circuit structure of the multi-layer electrode device 44. The fly height actuator 78 is powered through the fly height control voltage 71 via the multi-layer electrode device bond pad connection 48. The parasitic resistor $R_P$ is representative of the multi-layer electrode device bond pad connection 48 resistance and other minor resistance present in the system. Resistor $R_P$ has resistance from approximately 10 Ohms to a maximum of approximately 100 Ohms. The leakage resistor $R_L$ is representative of resistance produced by second insulator layer 64. Resistor $R_L$ has a resistance on the magnitude of mega-ohms or giga-ohms by making second insulator layer 64 of sufficient thickness. This can be seen generally with the equation $$R_L = \rho T_2 / A_2 \quad \text{Equation [1]}$$

where $R_L$ is the resistance, $\rho$ is the resistivity of second insulator layer 64 material, $T_2$ is the thickness of second insulator layer 64, and $A_2$ is the surface area of second insulator layer 64. In one embodiment, second insulator layer 64 has a thickness of 30 nm. Such high resistance will result in most current traveling through $C_1$ as shown by $I_1$. There will only be current on the order of nano-amps traveling through $R_L$ as shown by $I_2$. The high resistance-low amp arrangement of the multi-layer electrode device 44 results in reduced leakage current which is one benefit of this system. $C_1$ is representative of the capacitance formed by second insulator layer 64 between first electrode layer 68 and second electrode layer 70. $C_1$ is made to have a capacitance on the order of pico-farads by maintaining the thickness of second insulator layer 64 relatively high, such as 30 nm in the embodiment described above. This can be seen generally with the equation $$C_1 = K_1 \epsilon A_1 / T_1 \quad \text{Equation [2]}$$

where $C_1$ is the capacitance, $K_1$ is the dielectric constant of second insulator layer 64 material, $\epsilon$ is the permitivity of air, $A_1$ is the surface area of second insulator layer 64, and $T_1$ is the thickness of second insulator layer 64. The low capacitance of $C_1$ combined with most of the current $I_1$ of the system traveling through it results in rapid charge time. This is primarily due to the exclusion of any series resistance in the system which eliminates time dependant exponential RC charge rate. This can be seen generally from the equation $$Q = CV(1 - e^{[-(t/RC)]}) \quad \text{Equation [3]}$$

used for RC series circuits, where Q is the charge at $C_1$, C is the capacitance at $C_1$, V is the voltage at $C_1$, and t is the charge time. Rapid charge time of $C_1$, results in rapid response time of the fly height actuator 78 which is a second benefit of the system. $C_2$ is representative of the capacitance formed by third insulator layer 66 and the fly height 72 air gap between second electrode layer 70 and the magnetic disc 12. The capacitance of $C_2$ can be kept high by keeping third insulator layer 66 thin. This can be seen generally with the equation $$C_2 = K_2 \epsilon A_2 / (T_2 + K_2 d) \quad \text{Equation [4]}$$

where $C_2$ is the capacitance, $K_2$ is the dielectric constant of third insulator layer 66 material, $\epsilon$ is the permittivity of air, $A_2$ is the surface area of third insulator layer 66, $T_2$ is the thickness of third insulator layer 66, and d is the fly height air gap 72. In one embodiment third insulator layer 66 has a thickness of 5 nm. By keeping $C_2$ high and $C_1$ low, the voltage at $C_1$ can be kept low. This can be seen generally from the equation $$C_1 V_1 = C_2 V_2 \quad \text{Equation [5]}$$

where $C_1$ is the capacitance at $C_1$, $V_1$ is the voltage at $C_1$, $C_2$ is the capacitance at $C_2$, $V_2$ is the voltage at $C_2$ This reduces field emission discharge which is a third benefit of this invention. $C_2$ is also representative of the action of the fly height actuator 78. $R_O$ is the leakage resistance of insulator layer 66. $I_O$ is representative of the leakage current across the fly height air gap 72. As currents $I_1$ and $I_2$ enter $C_2$ and $R_O$, the amount of $I_O$ leakage current generated depends on the fly height 72. At larger fly heights, $I_O$ will be negligible. $I_O$ increases as fly height 72 decreases. The resistance of $R_0$ helps limit tunneling current and field emission discharge. The thickness of third insulator layer 66 is maintained relatively thin in order to not reduce fly height air gap 72 space and maintain high $C_2$ capacitance. As the remaining current from $I_1$ and $I_2$ enters $C_2$, $C_2$ charges adjusting the potential at C2 which in turn activates the fly height actuator 78. Fly height actuator 78 adjusts the fly height 72 as the potential at $C_2$ changes directly proportional to the voltage $V_{FH}$ supplied to first electrode layer 68 by the fly height controller 73.

The dual-electrode configuration of the multi-layer electrode device 44 is one embodiment of the invention. Depending on various response parameters required of the fly height control electrode, one skilled in the art could add additional electrode and insulating layers (to create addition series capacitances) as needed.

Figure 5:
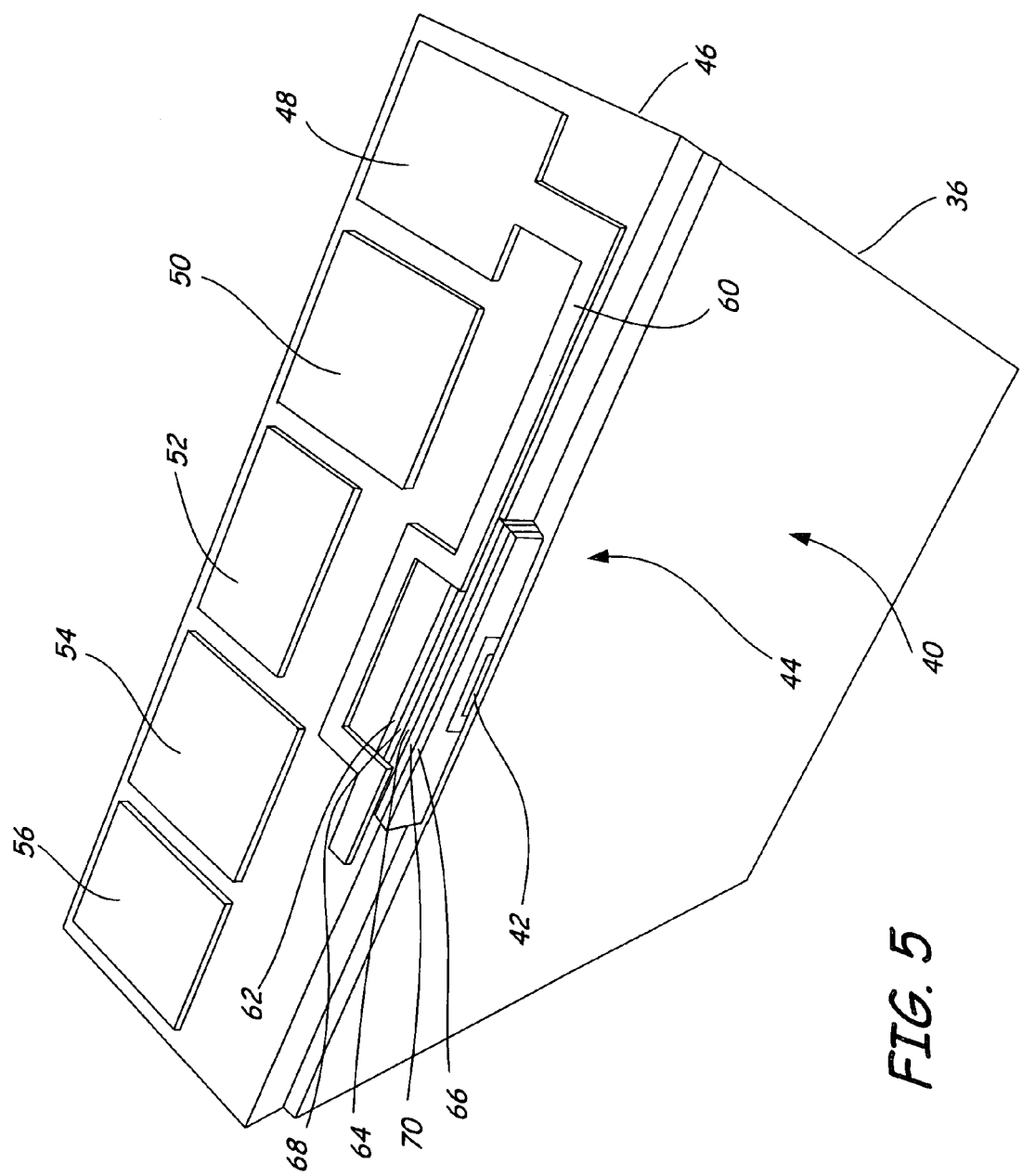
FIG. 5 is a perspective view of the slider containing a second embodiment of the multi-layer electrode device.

FIG. 5 is another embodiment of the present invention. In this embodiment the multi-layer electrode device 44 is a three-sided "C" shape. The improved performance of fly height actuators achieved in the embodiment of FIG. 2 are also achieved with this embodiment. This embodiment shares many of the same physical features as in the embodiment of FIG. 2. The slider in this embodiment, however, is not channeled to fit the multi-layer electrode device 44. Transducer 42 is positioned on the trailing edge of the surface of the slider 36 in the center. The multi-layer electrode device 44 is positioned on the trailing surface of the slider 36 such that the opening of the "C" shaped multi-layered electrode device 44 surrounds the lower portion of the transducer 42. The center opening of the "C" shaped multi-layer electrode device 44 is large enough to accommodate the transducer 42 and also to allow a sufficient gap between the transducer 42 and the multi-layer electrode device 44 in order to eliminate interference with read/write operations. In one embodiment the multi-layer electrode device 44 allows for a gap of between 20 microns to 100 microns. The overcoat 46 is deposited over the trailing edge of the slider 36. Overcoat 46 is further notched on the surface facing the magnetic disc 12 in order to accommodate the multi-layer electrode device 44. The transducer 42 is positioned between the slider 36 and the overcoat 46 such that a bottom portion of the transducer 42 extends into the notched region of the overcoat 46 along the slider 36.

Another advantage of this invention is that it maintains a thin film design. A thin film design is desirable because manufacturing is made easier. There are no additional patterning processes required. All the film layers in the stack are self-aligned and can be deposited with one photo patterning operation. Film thickness can be controlled when the stack is deposited using a multi-target cluster deposition tool.

Although the present invention has been described with reference to preferred embodiments, workers skilled in the art will recognize that changes may be made in form and detail without departing from the spirit and scope of the invention.

What is claimed is:

1. A multi-layer electrode for electrostatic control of fly height, the multi-layer electrode comprising:
   a first insulating layer having a top surface opposing a bottom surface of a slider and having a bottom surface;
   a first electrode layer for connection to an actuation power source having a top surface opposing the bottom surface of first insulator and having a bottom surface;
   a second insulator layer having a top surface opposing the bottom surface of the first electrode and having a bottom surface;
   a second electrode layer having a top surface opposing the bottom surface of the second insulator layer and having a bottom surface; and
   a third insulating layer having a top surface opposing the bottom surface of the second electrode layer and having a bottom surface.

2. The multi-layer electrode of claim 1 wherein the first insulating layer is made of dielectric material.

3. The multi-layer electrode of claim 1 wherein the second insulating layer is made of dielectric material.

4. The multi-layer electrode of claim 1 wherein the third insulating layer is made of dielectric material.

5. The multi-layer electrode of claim 1 wherein the first electrode layer is made of conductive material.

6. The multi-layer electrode of claim 1 wherein the second electrode layer is made of conductive material.

7. A slider comprising:
   a slider body for supporting a transducer;
   an electrostatic actuator electrode on the slider body for controlling fly height of the transducer with respect to a surface, the electrode having a first electrode layer connected to an actuation power source and a second electrode layer positioned between the first electrode layer and the surface, the second electrode layer being electrically insulated from the first electrode layer; and
   a bond pad connection for supplying actuation power to the first electrode layer.

8. The slider of claim 7 wherein the electrostatic actuator electrode further comprises:
   a first insulating layer between the slider and the first electrode layer;
   a second insulating layer between the first electrode layer and the second electrode layer; and
   a third insulating layer between the second electrode and the surface.

9. The slider of claim 7 wherein the slider includes a recessed portion in which the electrostatic actuator electrode is located.

10. A multi-layer electrode carried by a slider for use in controlling fly height of the slider with respect to a storage medium of a data storage system, wherein the multi-layer electrode forms a plurality of capacitors in series for applying a voltage between the slider and the storage medium.

11. The multi-layer electrode of claim 10 comprising:
   a first electrode layer for receiving a fly height control voltage; and
   a second electrode layer insulated from the first electrode layer and positioned between the first electrode layer and the storage medium.

12. The multi-layer electrode of claim 11 and further comprising:
   a first insulating layer between the slider and the first electrode layer;
   a second insulating layer between the first electrode layer and the second electrode layer; and
   a third insulating layer between the second electrode and the storage medium.

* * * * *

UNITED STATES PATENT AND TRADEMARK OFFICE
CERTIFICATE OF CORRECTION

PATENT NO. : 6,985,326 B2  Page 1 of 1
APPLICATION NO. : 10/715163
DATED : January 10, 2006
INVENTOR(S) : Jianxin Zhu et al.

It is certified that error appears in the above-identified patent and that said Letters Patent is hereby corrected as shown below:

Column 1, Line 57, delete "application Ser. No. 20020097517", insert --application 20020097517--

Column 1, Line 61, delete "application Ser. No 20030043497", insert --application 20030043497--

Column 5, Line 11, delete "desirable-that", insert --desirable that--

Column 5, Line 45, delete "6f second", insert --of second electrode layer 70 with the magnetic disc 12 low to limit field emission discharge and--

Column 5, Line 52, delete "Which", insert --which--

Signed and Sealed this

Thirtieth Day of January, 2007

JON W. DUDAS
*Director of the United States Patent and Trademark Office*